United States Patent
Seo

(10) Patent No.: US 11,488,607 B2
(45) Date of Patent: Nov. 1, 2022

(54) ELECTRONIC APPARATUS AND CONTROL METHOD THEREOF FOR ADJUSTING VOICE RECOGNITION RECOGNITION ACCURACY

(71) Applicant: SAMSUNG ELECTRONICS CO., LTD., Suwon-si (KR)

(72) Inventor: Heekyoung Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/010,270

(22) Filed: Sep. 2, 2020

(65) Prior Publication Data

US 2021/0074302 A1    Mar. 11, 2021

(30) Foreign Application Priority Data

Sep. 6, 2019 (KR) .......................... 10-2019-0110441

(51) Int. Cl.
*G10L 17/22* (2013.01)
*G10L 17/06* (2013.01)
(Continued)

(52) U.S. Cl.
CPC .............. *G10L 17/22* (2013.01); *G10L 15/04* (2013.01); *G10L 15/06* (2013.01); *G10L 15/22* (2013.01);
(Continued)

(58) Field of Classification Search
CPC ......... G10L 17/22; G10L 17/04; G10L 15/32; G10L 15/22; G10L 15/06; G10L 15/04; G10L 17/06; G10L 17/02; G10L 2015/221
(Continued)

(56) References Cited

U.S. PATENT DOCUMENTS 5,799,274 A * 8/1998 Kuroda ............... G10L 15/1807
704/239
9,401,143 B2    7/2016 Senior et al.
(Continued)

FOREIGN PATENT DOCUMENTS

| JP | 2013-64951 | 4/2013 |
| KR | 10-2016-0061135 | 5/2016 |
| KR | 10-2019-0096856 | 8/2019 |

OTHER PUBLICATIONS

International Search Report and Written Opinion of the International Searching Authority dated Dec. 30, 2020 in International Patent Application No. PCT/KR2020/011783.

*Primary Examiner* — Edwin S Leland, III
(74) *Attorney, Agent, or Firm* — Staas & Halsey LLP

(57) ABSTRACT

Disclosed is an electronic apparatus which identifies utterer characteristics of an uttered voice input received; identifies one utterer group among a plurality of utterer groups based on the identified utterer characteristics; outputs a recognition result among a plurality of recognition results of the uttered voice input based on a voice recognition model corresponding to the identified utterer group among a plurality of voice recognition models provided corresponding to the plurality of utterer groups, the plurality of recognition results being different in recognition accuracy from one another; identifies recognition success or failure in the uttered voice input with respect to the output recognition result; and changes a recognition accuracy of the output recognition result in the voice recognition model corresponding to the recognition success, based on the identified recognition success in the uttered voice input.

20 Claims, 8 Drawing Sheets

(51) Int. Cl.
  *G10L 17/02* (2013.01)
  *G10L 15/22* (2006.01)
  *G10L 15/32* (2013.01)
  *G10L 15/06* (2013.01)
  *G10L 15/04* (2013.01)
  *G10L 17/04* (2013.01)

(52) U.S. Cl.
  CPC .............. *G10L 15/32* (2013.01); *G10L 17/02* (2013.01); *G10L 17/04* (2013.01); *G10L 17/06* (2013.01); *G10L 2015/221* (2013.01)

(58) Field of Classification Search
  USPC ........................................................ 704/246
  See application file for complete search history.

(56) References Cited

U.S. PATENT DOCUMENTS

| | | | | |
|---|---|---|---|---|
| 10,553,219 | B2 * | 2/2020 | Jung | G10L 15/22 |
| 2003/0154077 | A1 * | 8/2003 | Tahara | G10L 15/10 |
| | | | | 704/239 |
| 2004/0015365 | A1 * | 1/2004 | Ohmori | G10L 15/22 |
| | | | | 704/E15.04 |
| 2007/0073540 | A1 * | 3/2007 | Hirakawa | G10L 15/22 |
| | | | | 704/E15.04 |
| 2008/0077391 | A1 * | 3/2008 | Chino | G10L 13/00 |
| | | | | 704/7 |
| 2014/0180689 | A1 * | 6/2014 | Kim | G10L 15/32 |
| | | | | 704/246 |
| 2015/0269931 | A1 * | 9/2015 | Senior | G10L 15/063 |
| | | | | 704/245 |
| 2015/0325240 | A1 * | 11/2015 | Li | G10L 15/08 |
| | | | | 704/231 |
| 2016/0125874 | A1 * | 5/2016 | Yong | G10L 15/14 |
| | | | | 704/251 |
| 2017/0069314 | A1 * | 3/2017 | Mun | G10L 15/183 |
| 2017/0076726 | A1 * | 3/2017 | Bae | G10L 15/22 |
| 2019/0043504 | A1 * | 2/2019 | Li | G10L 15/183 |
| 2020/0005774 | A1 * | 1/2020 | Yun | G10L 15/063 |
| 2021/0074302 | A1 * | 3/2021 | Seo | G10L 15/32 |
| 2022/0108689 | A1 * | 4/2022 | Tripathi | G10L 15/22 |

* cited by examiner

ELECTRONIC APPARATUS AND CONTROL METHOD THEREOF FOR ADJUSTING VOICE RECOGNITION RECOGNITION ACCURACY

CROSS-REFERENCE TO RELATED THE APPLICATION

This application is based on and claims priority under 35 U.S.C. § 119 to Korean Patent Application No. 10-2019-0110441 filed on Sep. 6, 2019 in the Korean Intellectual Property Office, the disclosure of which is incorporated by reference herein in its entirety.

BACKGROUND

Field

The disclosure relates to an electronic apparatus and a control method thereof, and more particularly to an electronic apparatus, which performs an operation based on a recognition result of an uttered voice, and a control method thereof.

Description of the Related Art

A voice recognition function, which has recently been actively studied, refers to a function of controlling an electronic apparatus to perform a specific operation based on a recognition result of a voice when an utterer intends to use the specific operation of the electronic apparatus and utters the voice corresponding to the specific operation. The recognition of the uttered voice may be performed based on a voice recognition model, i.e. a hardware/software component used for converting an audio signal corresponding to the uttered voice into text data analyzable by a processor or the like. The voice recognition model may for example include a hidden Markov Model (HMM), an acoustic model achieved by applying statistical modeling based on dynamic time warping (DTW) or the like algorithm to an uttered voice, a language mode achieved by collecting a corpus (i.e. a collection of texts given in the forms to be handled, processed and analyzed by a computer for language research), etc.

However, when voice recognition is performed based on a so-called general-purpose voice recognition model commonly used for many and unspecified utterers, the general-purpose voice recognition model does not take unique characteristics of a current utterer into account, and therefore a problem arises in that a recognition result obtained based on the general-purpose voice recognition model does not correctly reflect the utterer's utterance intention.

Unsuitability between the utterance intention and the recognition result becomes severe when an utterer's uttered voice does not match the utterance intention, for example, when the utterer has an incorrect pronunciation or has a mispronunciation by mistake. The unsuitability between the utterance intention and the recognition result causes an electronic apparatus to perform an unintended operation or to fail to perform an operation intended by the utterer, and therefore the reliability of the general voice recognition function may be lowered.

Accordingly, there is a need of improving the suitability between the utterance intention and the recognition result by performing the voice recognition based on the voice recognition model corresponding to the unique characteristics of the utterer.

Further, there is a need of improving the applicability and reliability of the voice recognition function by obtaining the recognition result in accordance with the utterance intention even though the uttered voice of the utterer does not match the utterance intention.

SUMMARY

According to an embodiment of the disclosure, there is provided an electronic apparatus comprising a processor configured to: identify utterer characteristics of an uttered voice input received; identify one utterer group among a plurality of utterer groups based on the identified utterer characteristics; output a recognition result among a plurality of recognition results of the uttered voice input based on a voice recognition model corresponding to the identified utterer group among a plurality of voice recognition models provided corresponding to the plurality of utterer groups, the plurality of recognition results being different in recognition accuracy from one another; identify recognition success or failure in the uttered voice input with respect to the output recognition result; and change a recognition accuracy of the output recognition result in the voice recognition model corresponding to the recognition success, based on the identified recognition success in the uttered voice input.

The processor is configured to obtain the recognition result, of which the recognition accuracy is the highest, among the plurality of recognition results.

The uttered voice input is a first uttered voice input, and the processor is configured to identify the recognition success or failure in the first uttered voice input based on similarity between the first uttered voice input and a second uttered voice input, when the second uttered voice input is received corresponding to an operation based on the obtained recognition result.

The processor is configured to change the recognition accuracies of the plurality of recognition results based on the identified recognition success or failure.

The recognition result is a first recognition result, and the processor is configured to obtain a second recognition result, of which the recognition accuracy is next highest, among the plurality of recognition results, when the similarity between the uttered voice input and the second uttered voice input is greater than or equal to a preset value.

The processor is configured to change the recognition accuracy of the second recognition result to be higher than the recognition accuracy of the first recognition result based on the recognition success or failure of the second recognition result.

The processor is configured to change the recognition accuracies of the plurality of recognition results based on a searching result of an input search word, when the input search word corresponds to an operation based on the second recognition result.

The utterer characteristics comprise information of at least one among genders, ages, names, residence, nationalities, and occupations of utterers.

The processor is configured to identify the utterer characteristics based on information of at least one among a tone, loudness, and pace of the received uttered voice input.

The processor is configured to obtain the recognition result of the uttered voice input, based on at least two voice recognition models among the plurality of voice recognition models.

Further comprising a communicator configured to communicate with a plurality of servers, wherein the processor is configured to receive the recognition result of the uttered voice input based on the voice recognition model identified corresponding to the utterer characteristics from at least one among the plurality of servers through the communicator.

According to another embodiment of the disclosure, there is provided a control method of an electronic apparatus, comprising: identifying utterer characteristics of an uttered voice input received; identifying one utterer group among a plurality of utterer groups based on the identified utterer characteristics; outputting a recognition result among a plurality of recognition results of the uttered voice input based on a voice recognition model corresponding to the identified utterer group among a plurality of voice recognition models provided corresponding to the plurality of utterer groups, the plurality of recognition results being different in recognition accuracy from one another; identifying recognition success or failure in the uttered voice input with respect to the output recognition results; and changing a recognition accuracy of the output recognition result in the voice recognition model corresponding to the recognition success, based on the identified recognition success in the uttered voice input.

The outputting the recognition results comprises obtaining the recognition result, of which the recognition accuracy is the highest, among a plurality of recognition results.

The uttered voice input is a first uttered voice input, and the method further comprises identifying recognition success or failure in the first uttered voice input based on similarity between the first uttered voice input and a second uttered voice input, when the second uttered voice input is received corresponding to an operation based on the obtained recognition result.

Further comprising changing the recognition accuracies of the plurality of recognition results based on the identified recognition success or failure.

The recognition result is a first recognition result, and the changing the recognition accuracies comprises obtaining a second recognition result, of which the recognition accuracy is next highest, among the plurality of recognition results, when the similarity between the uttered voice input and the second uttered voice input is greater than or equal to a preset value.

The obtaining the second recognition result comprises changing the recognition accuracy of the second recognition result to be higher than the recognition accuracy of the first recognition result based on the recognition success or failure of the second recognition result.

Further comprising changing the recognition accuracies of the plurality of recognition results based on a searching result of an input search word, when the input search word g to an operation based on the second recognition result.

The utterer characteristics comprise information of at least one among genders, ages, names, residence, nationalities, and occupations of utterers.

According to another embodiment of the disclosure, there is provided a computer readable recording medium, in which a computer program is stored comprising instructions for performing a control method of an electronic apparatus, the control method comprising: identifying utterer characteristics of an uttered voice input received; identifying one utterer group among a plurality of utterer groups based on the identified utterer characteristics; outputting a recognition result among a plurality of recognition results of the uttered voice input based on a voice recognition model corresponding to the identified utterer group among a plurality of voice recognition models provided corresponding to the plurality of utterer groups, the plurality of recognition results being different in recognition accuracy from one another; identifying recognition success or failure in the uttered voice input with respect to the output recognition results; and changing a recognition accuracy of the output recognition result in the voice recognition model corresponding to the recognition success, based on the identified recognition success in the uttered voice input.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION OF EMBODIMENTS

Figure 1:
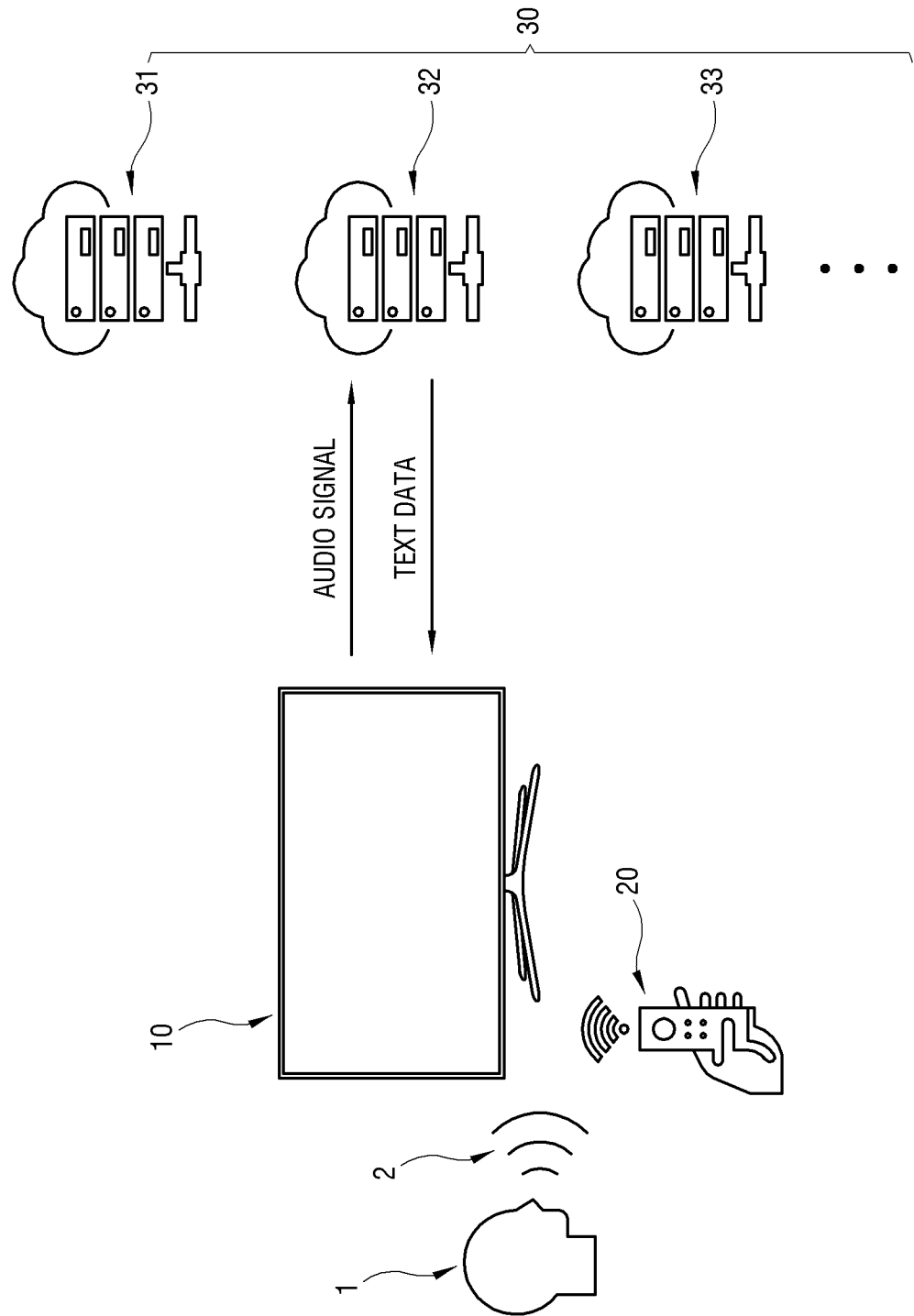
FIG. 1 illustrates an electronic apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates an electronic apparatus 10 according to an embodiment of the disclosure. As shown in FIG. 1, the electronic apparatus 10 may be embodied by a display apparatus capable of displaying an image. For example, the electronic apparatus 10 may include a television (TV), a computer, a smartphone, a tablet computer, a portable media player, a wearable device, a video wall, an electronic frame, etc. Further, the electronic apparatus 10 may be embodied by various kinds of apparatuses having no displays, for example, an image processing apparatus such as a set-top box, etc.; a home appliance such as a refrigerator, a washing machine, etc.; and an information processing apparatus such as a computer, etc. However, for convenience of description, it will be described below that the electronic apparatus 10 is embodied by the TV.

The electronic apparatus 10 may perform a voice recognition function. The electronic apparatus 10 receives an uttered voice 2 from an utterer 1, obtains an audio signal about the uttered voice 2, applies a voice recognition process to the obtained audio signal, and perform an operation corresponding to a recognition result of the obtained audio signal. Here, the voice recognition process includes a speech-to-text (STT) process for converting the audio signal into text data, and a command identifying-and-performing process for identifying a command in the text data and performing an operation based on the identified command. For example, when the uttered voice 2 contains "volume up", the electronic apparatus 10 received the uttered voice 2, obtains text data from the audio signal of the uttered voice 2, identifies a command in the obtained text data, and turns up the volume of the electronic apparatus 10 based on the identified command.

Both the STT process and the command identifying-and-performing process of the voice recognition process may be performed in the electronic apparatus 10. However, the electronic apparatus 10 in this case requires relatively much system load and storage capacity. Therefore, at least a part of the process may be performed by at least one server 30 to which the electronic apparatus 100 is accessibly connected through a network. For example, at least one server 30 may perform the STT process, and the electronic apparatus 10 may perform the command identifying-and-performing process.

Alternatively, at least one server 30 may perform all the STT process and the command identifying-and-performing process, and the electronic apparatus 10 may only receive results from the at least one server 30. For example, the electronic apparatus 10 may receive converted text data from a first server 31, which is for the STT process, of the at least one server 30, transmit the received text data to the second server 32 or the third server 33 so that the received text data can be subjected to the command identifying-and-performing process, and receive a result from the second server 32 or the third server 33. However, for convenience of description, it will be described below that the electronic apparatus 10 performs both the STT process and the command identifying-and-performing process.

To perform the STT process, the electronic apparatus 10 may include at least one voice recognition model. The voice recognition model refers to a hardware/software component used by a processor or the like for converting an audio signal corresponding to the uttered voice 2 into analyzable text data. The voice recognition model may be provided corresponding to unique characteristics based on utterer data and corpus data used in model development, for example, utterer characteristics. Therefore, the voice recognition models may output different recognition results even though the same uttered voice 2 is input.

The voice recognition model may be provided corresponding to the utterer 1. When there is a plurality of utterers, the voice recognition models may be provided to respectively correspond to the plurality of utterers. The electronic apparatus 10 may receive the uttered voice 2 of the utterer 1, identify who the utterer 1 is based on at least one among the tone, loudness, pace, frequency and period of the uttered voice 2, and identify a voice recognition model corresponding to the identified utterer 1 among the plurality of voice recognition models. However, there are no limits to a method of identifying the utterer 1. For example, when the utterer 1 inputs his/her own information, the electronic apparatus 10 may identify the utterer 1 based on the input information. Specifically, the electronic apparatus 10 may obtain an input image of the utterer and identify the utterer 1 based on the obtained image. Alternatively, the electronic apparatus 10 may identify the utterer 1 based on a use pattern, a use history, etc. of the utterer 1. Like this, when the voice recognition process is performed based on the voice recognition model corresponding to the utterer 1, it is possible to reflect the unique utterance characteristics of only the utterer 1, thereby improving suitability between utterance intention and a recognition result.

In particular, the voice recognition model may be provided corresponding to a plurality of utterer groups. The voice recognition model may for example be provided according to groups for genders, ages, names, residence, nationalities, occupations, etc. In a case of the groups for the genders, there may for be provided a voice recognition model for a male group and a voice recognition model for a female group. The voice recognition model for the male group and the voice recognition model for the female group are the voice recognition models applied to the groups respectively corresponding to the male and the female. Likewise, the voice recognition models provided according to the ages, for example, a voice recognition model for a twenties group and a voice recognition model for a fifties group are the voice recognition models applied to the groups for twenties and fifties. However, there are no limits to the voice recognition models applied to the groups, for example, the male, the female, the twenties, the fifties, etc., in other words, the male group, the female group, the twenties group, the fifties group, and the like utterer groups. Therefore, the voice recognition models may be designed for various kinds of utterer groups.

Further, voice recognition models may be provided according to two or more utterer groups. For example, in a case of the gender group and the age group, there may be provided a voice recognition model for a group of males in their twenties, a voice recognition model for a group of females in their twenties, etc. The voice recognition model for the group of males in their twenties may be a voice recognition model optimized for the group of males in their twenties, and the voice recognition model for the group of females in their twenties may be a voice recognition model optimized for the group of females in their twenties.

Further, a voice recognition model provided for two or more utterer groups may be combination of individual voice recognition models provided corresponding to the utterer groups. For example, the voice recognition model for the group of males in their twenties may be independently provided as a voice recognition model for one group, i.e. the group of males in their twenties, but may be provided by combination between the voice recognition model for the twenties group and the voice recognition model for the male group. Likewise, the voice recognition model for the group of females in their twenties may be provided by combination between the voice recognition model for the twenties group and the voice recognition model for the female group.

The electronic apparatus 10 may receive the uttered voice 2 of the utterer 1, and identify utterer characteristics. The electronic apparatus 10 may for example identify whether the utterer 1 is a male in his twenties or a female in her twenties, based on at least one among the tone, the loudness, the pace, the frequency and the period of the uttered voice 2. However, there are no limits to a method of identifying the utterer characteristics. For example, when the utterer 1 directly inputs information about the utterer characteristics, the electronic apparatus 10 may identify the utterer characteristics based on the input information. Specifically, the electronic apparatus 10 may obtain an image of the utterer 1 and identify the utterer characteristics based on the obtained image. Alternatively, the electronic apparatus 10 may identify the utterer characteristics based on the use pattern, the use history, etc. of the utterer 1.

The electronic apparatus 10 may identify one utterer group among the plurality of utterer groups based on the identified utterer characteristics. For example, when the utterer characteristics are identified as a male in his twenties, the group of males in their twenties may be identified among the plurality of utterer groups, e.g. the gender group and the age group. When the utterer characteristics are identified as a female in her twenties, the group of females in their twenties may be identified among the plurality of utterer groups.

The electronic apparatus 10 may select the voice recognition model corresponding to the identified utterer group. For example, when the group of males in their twenties is identified based on the utterer characteristics of the utterer 1, the voice recognition model corresponding to the group of males in their twenties may be selected among the plurality of voice recognition models provided corresponding to the plurality of utterer groups. Alternatively, the voice recognition model for the twenties group and the voice recognition model for the male group may be selected and combined among the plurality of voice recognition models provided corresponding to the utterer groups.

The electronic apparatus 10 may obtain a recognition result of the uttered voice 2 based on the voice recognition model corresponding to the identified utterer group, and perform an operation based on the obtained recognition result. For example, when the utterer characteristics are identified as a male in his twenties, a recognition result of the uttered voice 2 is obtained based on the voice recognition model for the group of males in their twenties, and an operation is performed based on the obtained recognition result.

Like this, the electronic apparatus 10 according to this embodiment performs the voice recognition process based on the voice recognition model of the utterer group, and it is thus possible to take the unique characteristics of the utterer group into account, thereby further improving the suitability between the utterance intention and the recognition result as compared with that of when the voice recognition is performed based on the voice recognition model personalized for only the utterer 1.

Figure 2:
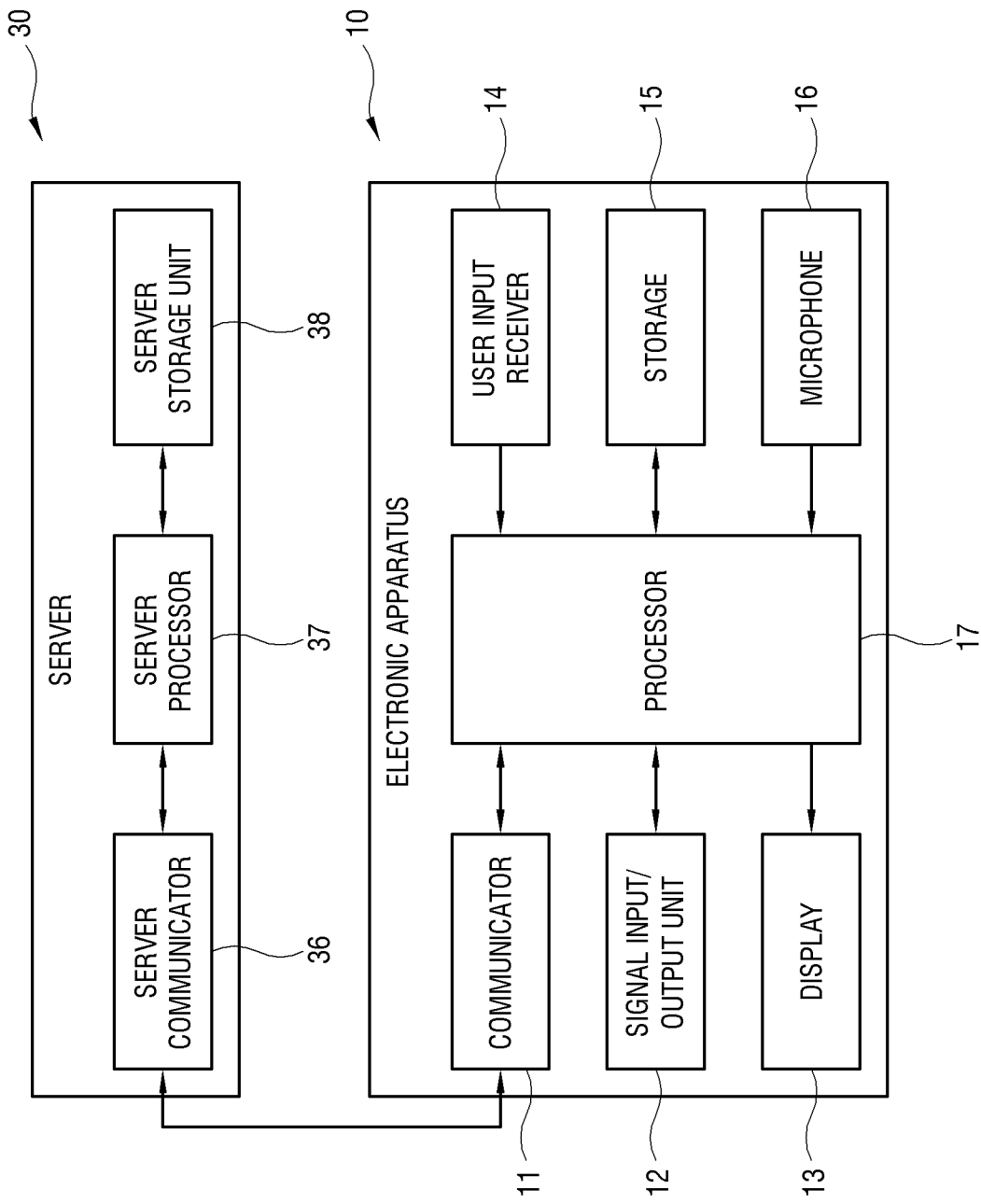
FIG. 2 illustrates a configuration of the electronic apparatus of FIG. 1.

FIG. 2 illustrates a configuration of the electronic apparatus of FIG. 1. As shown in FIG. 2, the electronic apparatus 10 may include a communicator 11, a signal input/output unit 12, a display 13, a user input receiver 14, a storage unit 15, a microphone 16, and a processor 17.

Below, the configuration of the electronic apparatus 10 will be described. In this embodiment, it will be described that the electronic apparatus 10 is a TV. However, the electronic apparatus 10 may be embodied by various kinds of apparatuses, and therefore the electronic apparatus 10 is not limited to this embodiment. The electronic apparatus 10 may not be embodied by the display apparatus, and the electronic apparatus 10 in this case may not include the display 13 and the like elements for displaying an image. For example, when the electronic apparatus 10 is embodied by a set-top box, the electronic apparatus 10 may output an image signal to an external apparatus such as a TV through the signal input/output unit 12.

The communicator 11 refers to an interactive communication circuit that includes at least one of elements, such as a communication module, a communication chip, etc. corresponding to various wired and wireless communication protocols. For example, the communicator 11 may be embodied by a wireless communication module that performs wireless communication with an access point (AP) based on Wi-Fi, a wireless communication module that performs one-to-one direct wireless communication based on Bluetooth or the like, or a local area network (LAN) card that is connected to a router or a gateway by a wire. The communicator 11 communicates with the server 30 on a network, thereby transmitting and receiving a data packet to and from the at least one server 30.

The communicator 11 may be configured to communicate with a remote controller 20 separated from the electronic apparatus 10, a smartphone, etc. For example, when the remote controller 20, the smartphone, etc. receives an audio signal, the communicator 11 may receive the audio signal from the remote controller 20, the smartphone, etc. In this case, the remote-control application may be installed in the smartphone or the like. The communicator 11 may receive the audio signal from the remote controller 20, the smartphone, etc. through, for example, Wi-Fi, Bluetooth, etc.

Further, the communicator 11 may include a configuration for transmitting and receiving data to and from the remote controller 20, the smartphone, etc. by Wi-Fi, Bluetooth, infrared, etc. However, when the communicator 11 communicates with at least one server 30, the communicator communicating with the at least one server 30 may be provided integrally with or separately from the communicator communicating with the remote controller 20, the smartphone, etc.

The signal input/output unit 12 is one-to-one or one-to-N (where, N is a natural number) connected to an external apparatus such as a set-top box or an optical media player by a wire, thereby receiving or outputting data from and to the corresponding external apparatus. The signal input/output unit may for example include a high definition multimedia interface (HDMI) port, a DisplayPort, a DVI port, a Thunderbolt, a universal serial bus (USB) port, and the like connectors or ports according to preset transmission standards.

The display 13 includes a display panel capable of displaying an image on a screen. The display panel 13 is provided to have a light receiving structure such as a liquid crystal type, or a self-emissive structure such as an organic light emitting diode (OLED) type. The display 13 may include an additional element according to the structures of the display panel. For example, when the display panel is the liquid crystal type, the display 13 includes a liquid crystal display panel, a backlight unit configured to emit light, and a panel driving substrate configured to drive liquid crystal of the liquid crystal display panel. However, the display 13 may be omitted when the electronic apparatus 10 is embodied by the set-top box or the like.

The user input unit 14 includes circuitry related to various input interfaces provided to be controlled by a user to make an input. The user input unit 14 may be variously configured according to the kinds of electronic apparatus 10, and may for example include a mechanical or electronical button of the electronic apparatus 10, a touch pad, a touch screen installed in the display 13, etc.

The storage unit 15 is configured to store digitalized data. The storage unit 15 includes a nonvolatile storage in which data is retained regardless of whether power is on or off, and a volatile memory into which data to be processed by the processor 17 is loaded and in which data is retained only when power is on. The storage includes a flash memory, a hard-disc drive (HDD), a solid-state drive (SSD), a read only memory (ROM), etc., and the memory includes a buffer, a random-access memory (RAM), etc. The storage unit 15 may include the voice recognition model for processing the STT process for the audio signal. The voice recognition model may be variously provided corresponding to many utterer groups.

The microphone 16 or a voice input unit is configured to collect sounds of external environments, such as the uttered voice 2 of the utterer 1. The microphone 16 transmits the collected audio signal to the processor 17. The microphone 16 may be provided in the main body of the electronic apparatus 10, or may be provided in the remote controller 20 separated from the main body of the electronic apparatus 10. For example, the audio signal collected through the microphone 16 provided in the remote controller 20, the smartphone, etc. may be digitalized and received in the communicator 11.

The processor 17 includes one or more hardware processors achieved by a central processing unit (CPU), a chipset, a buffer, a circuit, etc. which are mounted on a printed circuit board (PCB). Alternatively, the processor 17 may be designed as a system on chip (SoC). The processor 17 includes modules corresponding to various processes, such as a demultiplexer, a decoder, a scaler, an audio digital signal processor (DSP), an amplifier, etc. when the electronic apparatus 10 is embodied by a display apparatus. Among such modules, some or all of the modules may be achieved by the SoC. For example, a demultiplexer, a decoder, a scaler, and the like module related to an image process may be achieved as an image processing SoC, and an audio DSP may be achieved as a chipset separated from the SoC.

The processor 17 may identify an utterer group based on utterer characteristics identified based on the audio signal of the uttered voice 2 obtained through the microphone 16, select the voice recognition model in consideration of the identified utterer group, and apply the voice recognition process to the audio signal based on the selected voice recognition model. Further, the processor 17 may obtain text data as a recognition result of the voice recognition process, and perform an operation based on the text data. However, when the voice recognition process for the audio signal is carried out in at least one server 30, the processor 17 may transmit the audio signal obtained by the microphone 16 to the server 30 through the communicator 11, receive the text data as the recognition result of the audio signal from at least one server 30 through the communicator 11, process the text data received from the at least one server 30, and perform an operation based on the text data.

However, the electronic apparatus 10 may exclude some elements from the foregoing configuration, or may include another element in addition to the foregoing configuration. For example, the electronic apparatus 10 may further include a camera or the like image capturer to obtain an image of the utterer 1 corresponding to the uttered voice 2 of the utterer 1, and transmit a signal of the obtained image to the processor 17. The processor 17 may identify the utterer 1 based on the received signal, or may identify the utterer characteristics of the utterer 1, for example, whether or not the utter 1 is a male in his twenties.

Below, the configuration of the server 30 will be described. The server 30 may include a server communicator 36, a server storage unit 38, and a server processor 37.

The server communicator 36 refers to an interactive communication circuit that includes at least one of elements, such as a communication module, a communication chip, etc. corresponding to various wired and wireless communication protocols. The server communicator 36 supports communication standards corresponding to the communicator 11 of the electronic apparatus 10, thereby communicating with various kinds of clients such as the electronic apparatus 10 through a wide area network (WAN).

The server storage unit 38 allows the server processor 37 to perform reading, writing, modifying, deleting, updating, and the like operation with regard to data. The server storage unit 38 includes various nonvolatile and volatile memories such as a flash memory, an HDD, an SSD, a buffer, a RAM, etc. The server storage unit 38 may include the voice recognition model for the STT process of the audio signal. The voice recognition model may be variously provided according to many utterer groups.

The server processor 37 includes one or more hardware processors achieved by a CPU, a chipset, a buffer, a circuit, etc. which are mounted on a PCB. Alternatively, the processor 37 may be designed as a SoC. The server processor 37 may perform various processes based on information received from the electronic apparatus 10. For example, the server processor 37 may receive the audio signal of the uttered voice 2 from the electronic apparatus 10, identify the utterer characteristics of the uttered voice 2, identify the voice recognition model corresponding to the utterer group identified based on the utterer characteristics among the plurality of voice recognition models stored in the server storage unit 38, i.e. the plurality of voice recognition models provided according to the plurality of utterer groups, and obtain the text data of the uttered voice 2 based on the voice recognition model. The server processor may transmit the obtained text data to the electronic apparatus 10 so that the electronic apparatus 10 can perform an operation based on the text data.

Meanwhile, the processor 17 or the server processor 37 may use at least one of machine learning, neural network, deep learning algorithms as a rule-based or artificial intelligent (AI) algorithm to identify the utterer characteristics of the uttered voice 2, identify the utterer group based on the identified utterer characteristics, identify the voice recognition model corresponding to the identified utterer group, obtain the recognition result of the uttered voice 2 based on the identified voice recognition model, or perform at least some of data analysis, data process and result information generation for performing an operation based on the identified recognition result.

For example, the processor 17 or server processor 37 may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage unit 15 or server storage unit 38 or from the outside. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the foregoing operations. The target data may be obtained from the storage unit 15 or the server storage unit 38, or from the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

Figure 3:
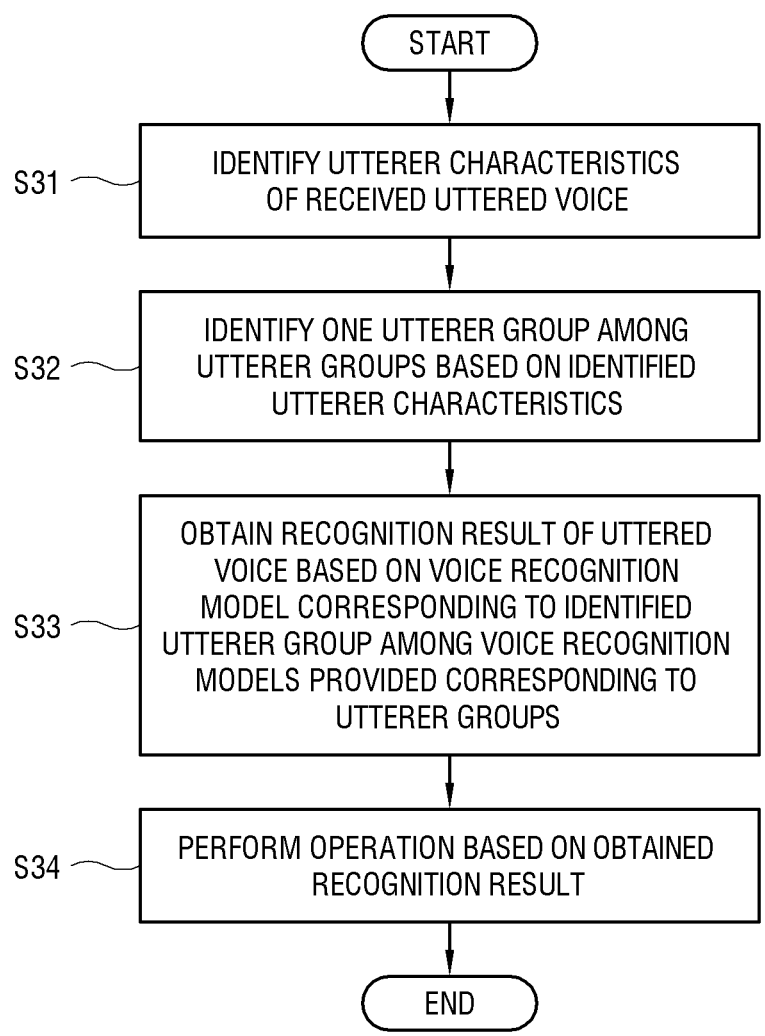
FIG. 3 illustrates a control method of the electronic apparatus of FIG. 1.

FIG. 3 illustrates a control method of the electronic apparatus of FIG. 1. Operations of FIG. 3 may be carried out by the processor 17 of the electronic apparatus 10. As shown in FIG. 3, the processor 17 may identify utterer characteristics of a received uttered voice 2 (S31).

Further, the processor 17 may identify one utterer group among the plurality of utterer groups based on the identified utterer characteristics (S32).

Further, the processor 17 may obtain the recognition result of the uttered voice 2 based on a voice recognition model corresponding to the identified utterer group among the plurality of voice recognition models corresponding to the plurality of utterer groups (S33).

Further, the processor 17 may perform an operation based on the obtained recognition result.

Like this, according to a control method of an embodiment of the disclosure, the voice recognition process is performed based on the voice recognition model of the utterer group, thereby further improving suitability between utterance intention and the recognition result as compared with that of when the voice recognition process is performed based on the voice recognition model personalized for only the utterer 1.

Figure 4:
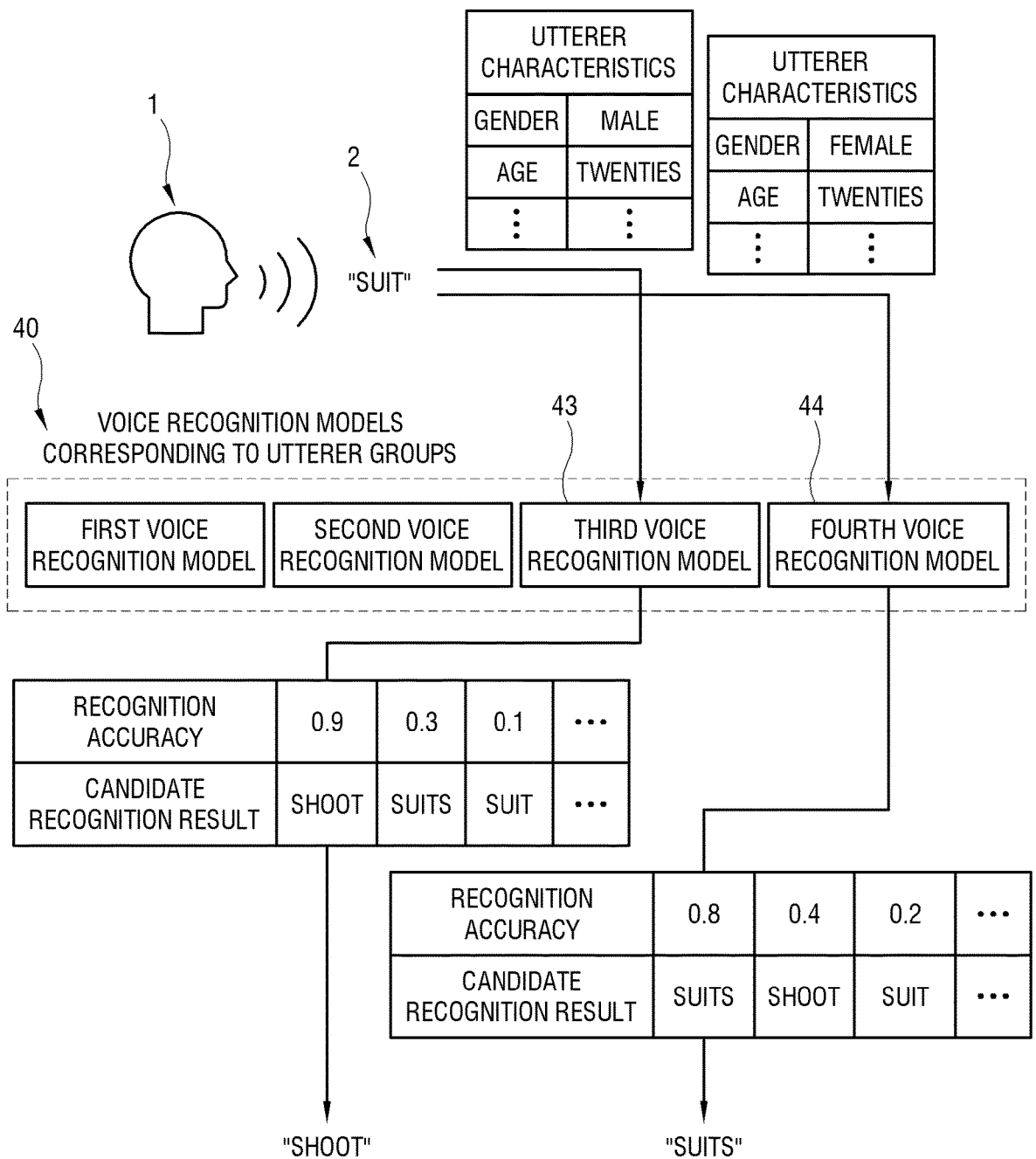
FIG. 4 illustrates that a recognition result is obtained in connection with operation S33 of FIG. 3.

FIG. 4 illustrates that a recognition result is obtained in connection with the operation S33 of FIG. 3. Below, it will be described in detail that the processor 17 obtains a recognition result of "suit" on the assumption that an utterer 1 utters a sound of "suit" as an uttered voice 2.

The processor 17 may identify the utterer characteristics based on the uttered voice 2. The processor 17 may identify the utterer characteristics, for example, a male in his twenties or a female in her twenties, based on the uttered voice 2. In this case, the processor 17 may refer to information about the tone, the loudness, the pace, etc. of the uttered voice 2 in order to identify the utterer characteristics, and such information may be stored in the form of a look-up table in the storage unit 15 or the server storage unit 38.

The processor 17 may select a voice recognition model, which corresponds to an utterer group identified based on the utterer characteristics, among voice recognition models 40 corresponding to the utterer groups. For example, the voice recognition models 40 corresponding to the utterer groups may be provided according to the genders and the ages. For example, as shown in FIG. 4, there may be provided a third voice recognition model 43 corresponding to a group of males in their twenties and a fourth voice recognition model 44 corresponding to a group of females in their twenties. However, the third voice recognition model 43 and the fourth voice recognition model 44 may be provided by combination of at least two voice recognition models, for example, combination between a voice recognition model for a twenties group and a voice recognition model for a male group, and combination between a voice recognition model for a twenties group and a voice recognition model for a female group, respectively.

When the utterer characteristics are identified as a male in his twenties, the processor 17 may select the third voice recognition model 43 corresponding to the group of males in their twenties, and perform the voice recognition process with regard to the uttered voice 2 of "suit" based on the third voice recognition model 43. On the other hand, when the utterer characteristics are identified as a female in her twenties, the processor 17 may select the fourth voice recognition model 44 corresponding to the group of females in their twenties, and perform the voice recognition process with regard to the uttered voice 2 of "suit" based on the fourth voice recognition model 44.

In more detail, the voice recognition models 40 corresponding to the utterer groups may include plurality of candidate recognition results of the uttered voice 2, and information about a recognition accuracy of each candidate recognition result. The candidate recognition result may include text data of which similarity with the text data of the uttered voice 2 is higher than or equal to a predetermined level. The recognition accuracy may refer to how accurately each candidate recognition result matches the utterance intention, in other words, may refer to utterance intention suitability between each candidate recognition result and the utterance intention.

The plurality of candidate recognition results and the recognition accuracies of the candidate recognition results may be different according to the voice recognition models provided corresponding to the utterer groups. For example, as shown in FIG. 4, the third voice recognition model 43 may present "shoot", "suits" and "suit" for the candidate recognition results of the uttered voice 2 of "suit", and the candidate recognition results of "shoot", "suits" and "suit" may respectively have the recognition accuracies of '0.9', '0.3' and '0.1'. However, the candidate recognition results and the recognition accuracies of the candidate recognition results are merely given for convenience of description, and may be variously designed. Here, the recognition accuracies of '0.9', '0.3' and '0.1' the candidate recognition results of "shoot", "suits" and "suit" have may refer to suitability for utterance intention of the group of males in their twenties with respect to the candidate recognition results of "shoot", "suits" and "suit", respectively.

In this case, the processor 17 may obtain the recognition result, for example, based on the candidate recognition result of "shoot" having the highest recognition accuracy among the plurality of candidate recognition results of "shoot", "suits" and "suit" with respect to the uttered voice 2 of "suit". That is, the processor 17 may obtain the recognition result of "shoot", which is the most suitable for the utterance intention of the group of males in their twenties, with respect to the uttered voice 2 of "suit".

On other hand, when the utterer characteristics are identified as a female in her twenties, the fourth voice recognition model 44 may present "suits", "shoot" and "suit" for the candidate recognition results of the uttered voice 2 of "suit", and the candidate recognition results of "suits", "shoot" and "suit" may respectively have the recognition accuracies of '0.8', '0.4' and '0.2'. Here, the recognition accuracies of '0.8', '0.4' and '0.2' the candidate recognition results of "suits", "shoot" and "suit" have may refer to suitability for utterance intention of the group of females in their twenties with respect to the candidate recognition results of "suits", "shoot" and "suit", respectively.

In this case, the processor 17 may obtain the recognition result, for example, based on the candidate recognition result of "suits" having the highest recognition accuracy among the plurality of candidate recognition results of "suits", "shoot" and "suit", with respect to the uttered voice 2 of "suit". That is, the processor 17 may obtain the recognition result of "suits", which is the most suitable for the utterance intention of the group of females in their twenties, with respect to the uttered voice 2 of "suit".

Like this, the same uttered voice 2 may cause different recognition results according to the utterer groups based on the utterer characteristics, for example, according to the group of males in their twenties or the group of females in their twenties. That is, the processor 17 according to an embodiment may obtain the most suitable recognition result for the utterance intention of the utterer 1 even though the same uttered voice 2 is input.

In particular, the processor 17 according to an embodiment may obtain the recognition result suitable for the utterance intention even though the uttered voice 2 of the utterer 1 does not match the utterance intention. For example, the utterance intention may not match the uttered voice 2 like a case that the utterer 1, i.e. a male in his twenties utters a sound of "suit" to intend to watch a "shooting scene". In this case, the processor 17 may obtain, for example, the candidate recognition result of "shoot", which has the highest recognition accuracy, as the recognition result with regard to the uttered voice 2 of "suit" based on the third voice recognition model 43.

In other words, based on the third voice recognition model 43, the most suitable recognition result of "shoot" for the utterance intention of the group of males in their twenties is obtained corresponding to the uttered voice 2 of "suit", and it is therefore possible to obtain the most suitable recognition result of "shoot" for the utterance intention even though the utterance intention of the utterer 1 does not match the uttered voice 2.

Further, in terms of obtaining the recognition result of "shoot" in response to the uttered voice 2 of "suit", the recognition accuracy, which shows a degree of suitability for the utterance intention of the group of males in their twenties, is taken into account, thereby guaranteeing the easiness and reliability in obtaining the recognition result of "shoot".

Like this, the processor 17 according to this embodiment can obtain a recognition result suitable for utterance intention even though there is a mismatch between the utterance intention and the uttered voice 2, obtain the recognition result based on a recognition accuracy, thereby guaranteeing the easiness and reliability in obtaining the recognition result. Therefore, it is possible to improve the applicability and reliability of the general voice recognition functions.

Meanwhile, the foregoing embodiments show that the voice recognition process is performed based on voice recognition engines provided according to the utterer groups, but the processor 17 may perform the voice recognition process based on a voice recognition engine corresponding to a specific utterer among the voice recognition engines personalized for the utterers 1, i.e. provided corresponding to a plurality of utterers to thereby obtain a recognition result suitable for the utterance intention of the utterer 1.

For example, on the assumption that the third voice recognition model 43 shown in FIG. 4 is a voice recognition engine 43 corresponding to the utterer 1, the processor 17 may identify the utterer 1 based on the uttered voice 2 and identify the voice recognition engine 43 corresponding to the identified utterer 1. For example, with regard to the uttered voice 2 of "suit" of the utterer 1, the processor 17 may obtain the recognition result of "shoot", which is the most suitable for the utterance intention of the utterer 1, i.e. which is optimized based on the recognition accuracies of the candidate recognition results of "shoot", "suits" and "suit", based on the identified voice recognition engine 43.

Further, although the utterer 1 intends to watch a "shooting scene" but utters a sound of "suit", the processor 17 may for example obtain the candidate recognition result of "shoot", which has the highest recognition accuracy, as the recognition result with respect to the uttered voice 2 of "suit", based on the voice recognition model 43 personalized for the utterer 1. Therefore, it is possible to obtain the most suitable recognition result of "shoot" for the utterance intention even when there is a mismatch between the utterance intention of the utterer 1 and the uttered voice 2.

Figure 5:
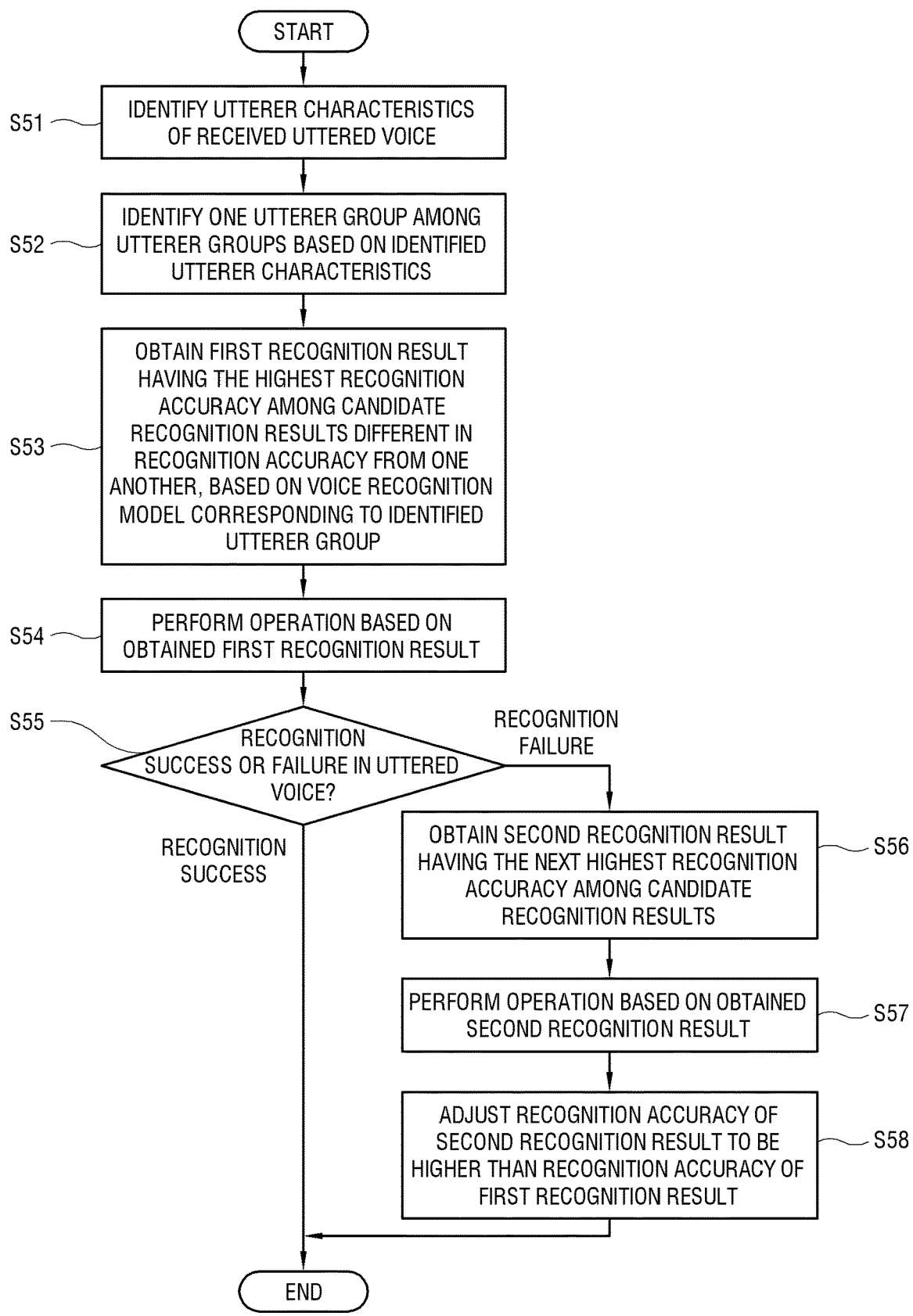
FIG. 5 illustrates a control method of an electronic apparatus that adjusts a recognition accuracy according to recognition success or failure in an uttered voice in connection with the operation S33 of FIG. 3.

FIG. 5 illustrates a control method of an electronic apparatus that adjusts a recognition accuracy according to recognition success or failure in an uttered voice in connection with the operation S33 of FIG. 3. The operation of FIG. 5 may be carried out by the processor 17 of the electronic apparatus 10. The operations S51 and S52 shown in FIG. 5 are equivalent to the operations S31 and S32 of FIG. 3, and therefore repetitive descriptions thereof will be avoided.

Referring to FIG. 5, the processor 17 may identify the voice recognition model corresponding to the identified utterer group among the plurality of voice recognition models provided corresponding to the plurality of utterer groups; obtain a first recognition result having the highest recognition accuracy among the plurality of candidate recognition results, which are different in recognition accuracy from one another, based on the identified voice recognition model (S53); and perform an operation based on the obtained first recognition result (S54).

Further, the processor 17 may identify the recognition success or failure in the uttered voice 2 (S55).

When the recognition of the uttered voice 2 is failed, the processor 17 may obtain the next order second recognition result among the plurality of candidate recognition results (S56), perform an operation based on the obtained second recognition result (S57), and adjust the recognition accuracy of the second recognition result to be higher than the recognition accuracy of the first recognition result (S58). For example, the recognition accuracy of the second recognition result may be adjusted to be higher than its previous recognition accuracy.

Like this, according to the control method of the electronic apparatus 10 in this embodiment, it is possible to adjust the recognition accuracy of the candidate recognition result based on the recognition success or failure in the uttered voice 2, thereby improving the suitability between the utterance intention and the recognition result, and further improving the applicability and reliability of the voice recognition function.

Figure 6:
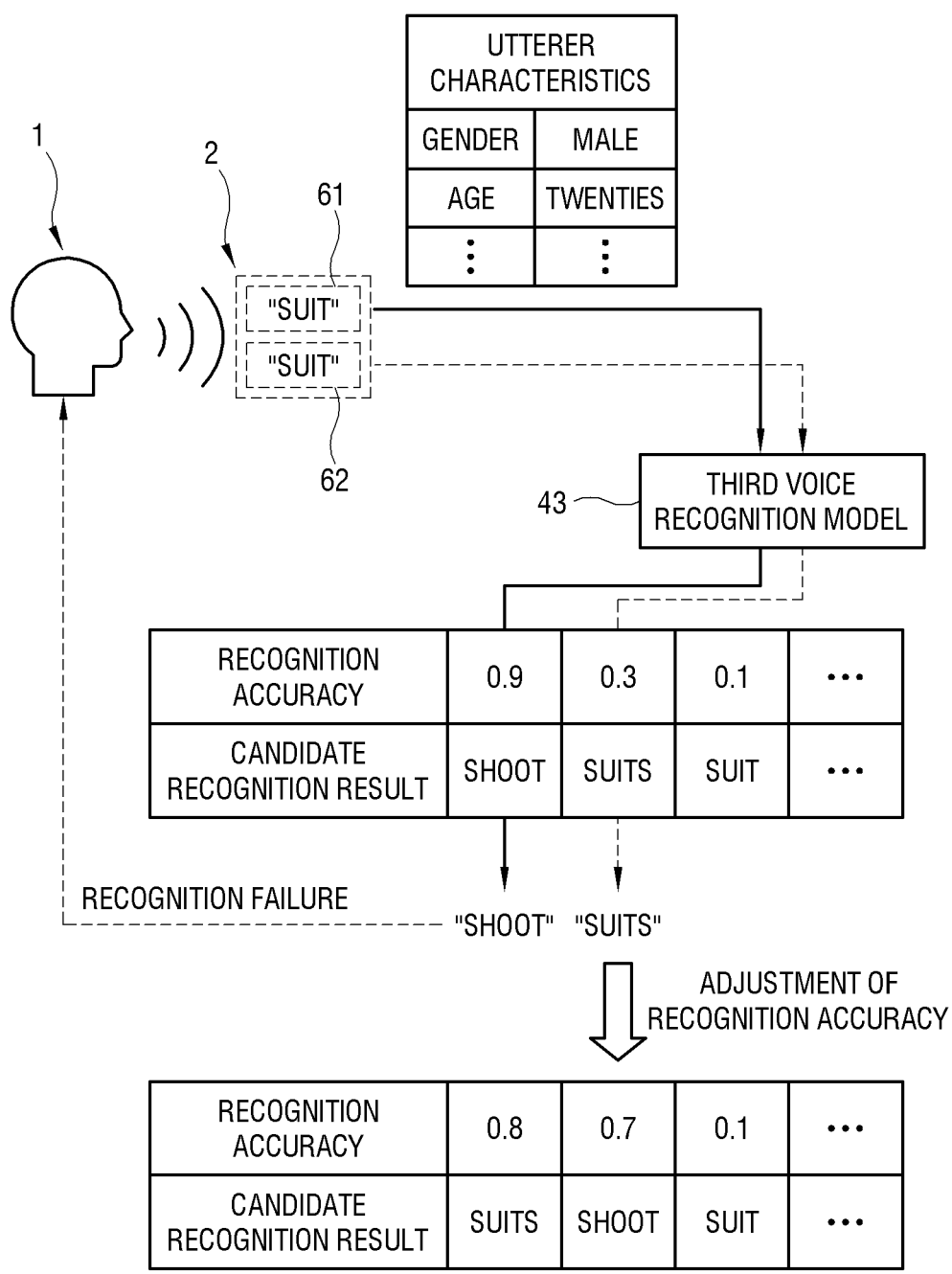
FIG. 6 illustrates that a recognition result suitable for utterance intention is obtained by adjusting a recognition accuracy even though an uttered voice does not match the utterance intention, in connection with operation S55 of FIG. 5.

FIG. 6 illustrates that a recognition result suitable for utterance intention is obtained by adjusting a recognition accuracy even though an uttered voice does not match the utterance intention, in connection with operation S55 of FIG. 5. Below, it will be assumed that the utterer characteristics of the utterer 1 are a male in his twenties, and the utterer 1 intends to watch a TV drama titled "suits" but utters a first uttered voice 61 of "suit".

The processor 17 identifies that the utterer characteristics are a male in his twenties based on the first uttered voice 61 of "suit", and performs the voice recognition process with respect to the first uttered voice 61 of "suit" based on the third voice recognition model 43 corresponding to the group of males in their twenties. In other words, the processor 17 may for example obtain the candidate recognition result of "shoot", which has the highest recognition accuracy, as the first recognition result among the plurality of candidate recognition results of "shoot", "suits" and "suit" based on the third voice recognition model 43.

The processor 17 may perform an operation based on the obtained first recognition result of "shoot". For example, the first recognition result of "shoot" may be displayed in the form of a text as it is, or an image of "shooting scene" may be displayed. However, the operation based on the recognition result is not limited to the displaying operation related to the first recognition result, and therefore various operations may be designed.

When the utterer 1 is not satisfied with the operation based on the first recognition result of "shoot", the utterer 1 may utter a sound of "suit" once more to get a satisfactory recognition result.

Taking this case into account, the processor 17 may identify the recognition success or failure in the first uttered voice 61 of "suit", in accordance with the operation based on the first recognition result. For example, according to the operation based on the first recognition result, the recognition success or failure in the first uttered voice 61 of "suit" may be identified based on a second uttered voice 62 received from the utterer 1.

In this case, the processor 17 may consider similarity between the first uttered voice 61 and the second uttered voice 62. When the similarity between the first uttered voice 61 and the second uttered voice 62 is identified based on, for example, the Markov model, dynamic time warping (DTW), or the like algorithm, the similarity between the first uttered voice 61 and the second uttered voice 62 is scored to thereby identify that the first uttered voice 61 and the second uttered voice 62 are similar when the score is greater than or equal to a preset value but identify that the first uttered voice 61 and the second uttered voice 62 are different when the score is lower than the preset value. However, the identification of the similarity between the first uttered voice 61 and the second uttered voice 62 is not limited to this method, but may be variously designed.

When the score of the similarity between the first uttered voice 61 and the second uttered voice 62 is lower than the preset value, the processor 17 may identify that the first uttered voice 61 of "suit" is successfully recognized. Unlike the foregoing assumption, when the utterer 1 intends to watch the "shooting scene" but utters the uttered voice 61 of "suit", and the first recognition result of "shoot" is literally displayed in the form of a text, the first recognition result of "shoot" matches the utterance intention and therefore the processor 17 may identify the recognition success in the first uttered voice 61 of "suit" when the second uttered voice 62 of "yes" different from the first uttered voice 61 of "suit" is received.

On the other hand, when the score of the similarity between the first uttered voice 61 and the second uttered voice 62 is greater than or equal to the preset value, the processor 17 may identify that the first uttered voice 61 of "suit" is not successfully recognized. As assumed above, when the first recognition result of "shoot" is literally displayed in the form of a text in response to the uttered voice 61 of "suit" even though the utterance intention is to watch a TV drama titled "suits", the first recognition result of "shoot" does not match the utterance intention and therefore the processor 17 may receive, for example, the second uttered voice 62 of "suit" once again. In this case, the processor 17 may identify that the recognition of the first uttered voice 61 of "suit" is failed because the first uttered voice 61 of "suit" is the same as the second uttered voice 62 of "suit".

Like this, when it is identified based on the similarity between the first uttered voice 61 and the second uttered voice 62 that the recognition of the first uttered voice 61 is failed, the processor 17 may obtain the second recognition result based on the third voice recognition model 43. For example, the candidate recognition result of "suits", which has the second highest recognition accuracy, among the plurality of candidate recognition results of "shoot", "suits" and "suit" may be obtained as the second recognition result, and an operation may be performed based on the obtained second recognition result of "suits". As an example of the operation, the second recognition result of "suits" may be literally displayed in the form of a text, or information about the TV drama titled "suits" may be displayed.

The processor 17 may identify the recognition success or failure in the second uttered voice 62 of "suit" based on the operation corresponding to the second recognition result of "suits". A method of identifying the recognition success or failure in the second uttered voice 62 of "suit" is similar to the foregoing method of identifying the recognition success or failure in the first uttered voice 61, for example, the identification method based on the similarity between the second uttered voice 62 and a subsequently uttered voice, and therefore repetitive descriptions thereof will be avoided.

When it is identified that the second uttered voice 62 of "suit" is successfully recognized, the processor 17 may adjust the recognition accuracy that the second recognition result of "suits" obtained with regard to the second uttered voice 62 has. For example, the recognition accuracy about the second recognition result of "suits" may be adjusted based on the following expression for adjusting the recognition accuracy.

Recognition accuracy (NEW)=Recognition accuracy (ORIG.)*Weight [Expression]

In the foregoing expression for adjusting the recognition accuracy, Weight may be identified by various methods in consideration of the number, the tone, the loudness, etc. of second uttered voices 62 subsequent to the first recognition result. Therefore, the processor 17 may increase the recognition accuracy about the second recognition result of "suits", for example, from the recognition accuracy (ORIG.) of '0.3' to the recognition accuracy (NEW) of '0.8', but may decrease the recognition accuracy about the first recognition result of "shoot", for example, from the recognition accuracy (ORIG.) of '0.9' to the recognition accuracy (NEW) of '0.7'.

Therefore, when the uttered voice of "suit" is received from the utterer 1 or another utterer in the future and the utterer characteristics of the utterer 1 or another utterer are identified as a male in his twenties, the processor 17 may obtain the recognition result of "suits" based on the third voice recognition model 43 which has the adjusted recognition accuracy. In other words, even though the utterance intention of "suits" is different from the uttered voice of "suit", it is possible to obtain the recognition result of "suits" suitable for the utterance intention of "suits".

Thus, the processor 17 according to an embodiment adjusts the recognition accuracy of the voice recognition model based on the recognition success or failure in the uttered voice, and obtains the recognition result suitable for the utterance intention even though the utterance intention does not match the uttered voice, thereby improving the suitability between the utterance intention and the recognition result and improving the applicability and reliability of the voice recognition function.

Meanwhile, when the recognition accuracy is adjusted with regard to the voice recognition engine corresponding to the utterer group, the processor 17 may adjust the recognition accuracy of the voice recognition engine corresponding to another the utterer group. For example, as described above, when the recognition accuracy about the second recognition result of "suits" is increased with regard to the third voice recognition model 43 for the group of males in their twenties, and the recognition accuracy about the first recognition result of "shoot" is decreased, the processor 17 may for example identify a relevant utterer group, such as the group of females in their twenties, among the groups with respect to the ages. The processor 17 may adjust the recognition accuracy about the recognition result of the fourth voice recognition model 44 for the group of females in their twenties identified to have a relationship. For example, the recognition accuracies about the candidate recognition results of "suits" and "shoot" may be adjusted to the same extent as the recognition accuracy adjusted in the third voice recognition model 43, or may be respectively adjusted into '0.9' and '0.6' in proportion to the recognition accuracies adjusted in the third voice recognition model 43 by considering that the candidate recognition results of "suits" and "shoot" respectively have the recognition accuracies of '0.8' and '0.7' in the fourth voice recognition engine 44. However, the recognition accuracy of the voice recognition model for another group having a relationship among the groups may be adjusted with respect to the gender, the name, the residential area, nationality, occupation, etc. as well as the age, and a degree of adjustment may be variously set according to design.

Further, the foregoing embodiments show that the voice recognition process is performed based on the voice recognition engines provided according to the utterer groups, but the processor 17 may adjust the recognition accuracy of the voice recognition model according to the recognition success or failure in the uttered voice 2 with respect to the voice recognition process based on the voice recognition engine personalized for the utterer 1. Below, the voice recognition process based on a voice recognition engine 43 personalized for the utterer 1 will be described with reference to FIG. 6 on the assumption that the third voice recognition model 43 is the personalized voice recognition engine 43. However, redundant descriptions will be omitted for convenience of description, and descriptions will be made focusing on differences.

The processor 17 may identify the utterer 1 based on the uttered voice 2, and identify the voice recognition engine 43 corresponding to, i.e. personalized for the identified utterer 1. The processor 17 may identify the recognition success or failure in the first uttered voice 61 of "suit" based on similarity between the first uttered voice 61 and the second uttered voice 62. When the similarity between the first uttered voice 61 and the second uttered voice 62 is greater than or equal to a preset value, the processor 17 may identify that the first uttered voice 61 of "suit" is not successfully recognized. For example, when the second uttered voice 62 of "suit" is received once more, the processor 17 may identify that the first uttered voice 61 of "suit" is not successfully recognized because the first uttered voice 61 of "suit" is the same as the second uttered voice 62 of "suit".

Like this, when it is identified based on the similarity between the first uttered voice 61 and the second uttered voice 62 that the recognition of the first uttered voice 61 is failed, the processor 17 may obtain the second recognition result of "suits" based on the voice recognition model 43, and identify the recognition success or failure in the second uttered voice 62 of "suit" based on the operation corresponding to the second recognition result of "suits". When it is identified that the second uttered voice 62 of "suit" is successfully recognized, the processor 17 may adjust the recognition accuracy about the second recognition result of "suits" with respect to the second uttered voice 62.

Like this, it is possible to adjust the recognition accuracy of the voice recognition model according to the recognition success or failure in the uttered voice 2, with respect to the voice recognition process based on the voice recognition engine personalized for the utterer 1, thereby obtaining the most suitable recognition result for the utterance intention.

Figure 7:
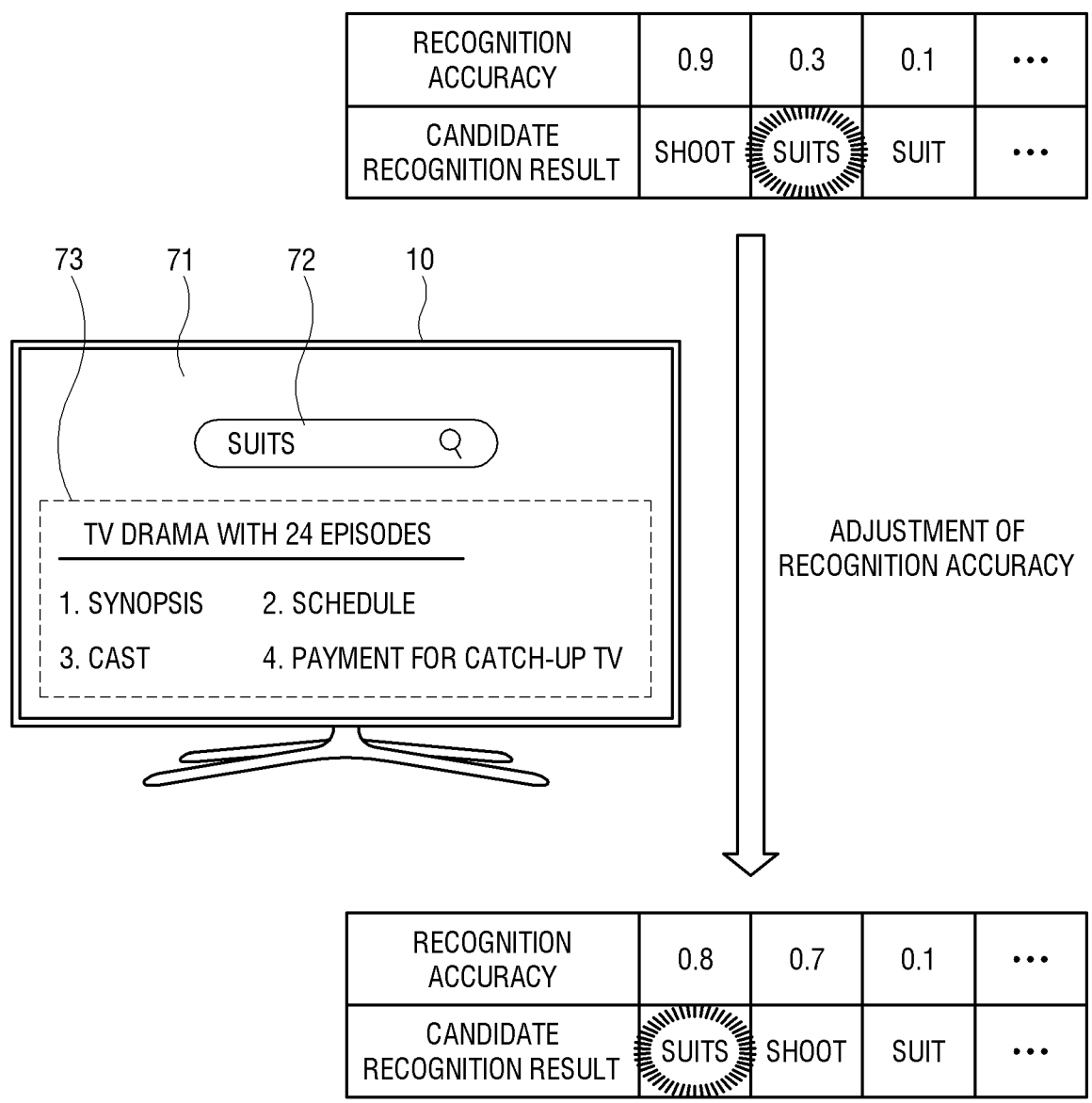
FIG. 7 illustrates that a recognition accuracy is adjusted when a search word is input, in connection with the operation S55 of FIG. 5.

FIG. 7 illustrates that a recognition accuracy is adjusted when a search word is input, in connection with the operation S55 of FIG. 5. Below, it will be described that the recognition accuracy is adjusted when the search word is input corresponding to the operation based on the first recognition result of "shoot" with respect to the uttered voice 2 of "suit" on the assumption that the utterer characteristics of the utterer 1 are a male in his twenties and the utterer 1 intends to watch a TV drama titled "suits" but utters the uttered voice 2 of "suit".

In other words, the processor 17 may for example obtain the candidate recognition result of "shoot", which has the highest recognition accuracy, as the first recognition result, based on the third voice recognition model 43 for the group of males in their twenties with respect to the uttered voice 2 of "suit", and perform an operation based on the obtained first recognition result of "shoot".

When the utterer 1 is not satisfied with the operation corresponding to the first recognition result of "shoot", the utterer 1 may directly input a search word 72 such as "suit", "suits", etc. through a browser or the like screen 71 to thereby find a satisfactory searching result 73. Here, the search word 72 such as "suit", "suits", etc. may be a text corresponding to the uttered voice 2 of "suit", "suits", etc.

In this regard, the processor 17 may for example identify the recognition success or failure in the uttered voice 2 of "suit" based on similarity between the first recognition result of "shoot" and the search word 72 such as "suit", "suits", etc. When the similarity between the search word 72 such as "suit", "suits", etc. and the first recognition result of "shoot" is greater than or equal to a preset value, the processor 17 may identify that the recognition of the uttered voice 2 of "suit" is failed.

Further, the processor 17 may identify finding success or failure in the search word 72 such as "suit", "suits", etc. For example, when a pattern or history of using the searching result 73 by the utterer 1, for example, various menus related to the search word 72 such as "suits" are included in the searching result 73 of the search word 72 such as "suits", and the utterer 1 makes an input for selecting the menus, it is identified that the search word 72 such as "suits" is successfully found. However, there are no limits to the method of identifying the founding success or failure, and therefore the founding success or failure may be identified by various methods according to design.

Like this, when the uttered voice 2 of "suit" is not successfully recognized but the search word 72 such as "suits" is successfully found, the processor 17 may adjust recognition accuracies about the candidate recognition result of "shoot" corresponding to the uttered voice 2 of "suit" and the candidate searching result of "suits" corresponding to the search word 72 of "suits". The recognition accuracy about the candidate recognition result of "suits" may for example be adjusted from '0.3' into '0.8'. When the search word 72 of "suits" is not included in the candidate recognition result, "suits" may be included in the candidate recognition results. On the other hand, the recognition accuracy about the recognition result of "shoot" may for example be adjusted from '0.9' into '0.7'.

Therefore, when the uttered voice 2 of "suit" is received from the utterer 1 or another utterer in the future and the utterer characteristics of the utterer 1 or another utterer are identified as a male in his twenties, the processor 17 may obtain the first recognition result of "suits" based on based on the third voice recognition model 43 which has the adjusted recognition accuracy.

Meanwhile, it will be described below with reference to FIG. 6 that the recognition accuracy is adjusted when the search word is input corresponding to the operation based on the second recognition result of "suit" from the second uttered voice 62 of "suit", on the assumption that the third voice recognition model 43 has the candidate recognition results of "shoot", "suit" and "suits" with regard to the first uttered voice 61 of "suit", and the recognition accuracies about the candidate recognition results are respectively '0.9', '0.3' and '0.1', that is, on that assumption that the recognition accuracies of "suit" and "suits" among the candidate recognition results are changed.

That is, when the second uttered voice 62 of "suit" is received in response to the operation based on the first recognition result of "shoot" from the first uttered voice 61 of "suit", the processor 17 may for example identify the failure in recognizing the first uttered voice 61 of "suit" based ono the similarity between the first uttered voice 61 of "suit" and the second uttered voice 62 of "suit", and perform an operation based on the second recognition result of "suit" from the second uttered voice 62 of "suit".

The utterer 1 may directly input the search word 72 such as "suits", etc. through a browser or the like screen 71 in order to find a satisfactory searching result 73, in response to the operation based on the second recognition result of "suit" from the second uttered voice 62 of "suit". The foregoing embodiment shows that the search word 72 is input in response to the operation based on the first recognition result of "shoot", but this embodiment differently shows that the search word 72 is input in response to the operation based on the second recognition result of "suit".

In this regard, the processor 17 may for example identify the recognition success or failure in the second uttered voice of "suit" based on the similarity between the second recognition result of "suit" and the search word 72 of "suits", etc., and may identify the founding success or failure in the search word 72 of "suits", etc. based on the use pattern or the use history of the searching result 73.

When it is identified that the second uttered voice 62 of "suit" is not successfully recognized but the search word 72 of "suits" is successfully found, the processor 17 may adjust the recognition accuracy of the candidate searching result "suits" corresponding to the search word 72 of "suits" to be for example the highest in the third voice recognition model 43. Therefore, when the utterer characteristics of the utterer 1 or another utterer are identified as a male in his twenties even though the first uttered voice 61 of "suit" is received from the utterer 1 or another utterer in the future, the processor 17 can obtain the first recognition result of "suits" based on the third voice recognition model 43 with the adjusted recognition accuracy.

Thus, the processor 17 according to this embodiment adjusts the recognition accuracy according to the search word inputs with respect to the recognition result, thereby improving the suitability between the utterance intention and the recognition result and improving the applicability and reliability of the voice recognition function.

Figure 8:
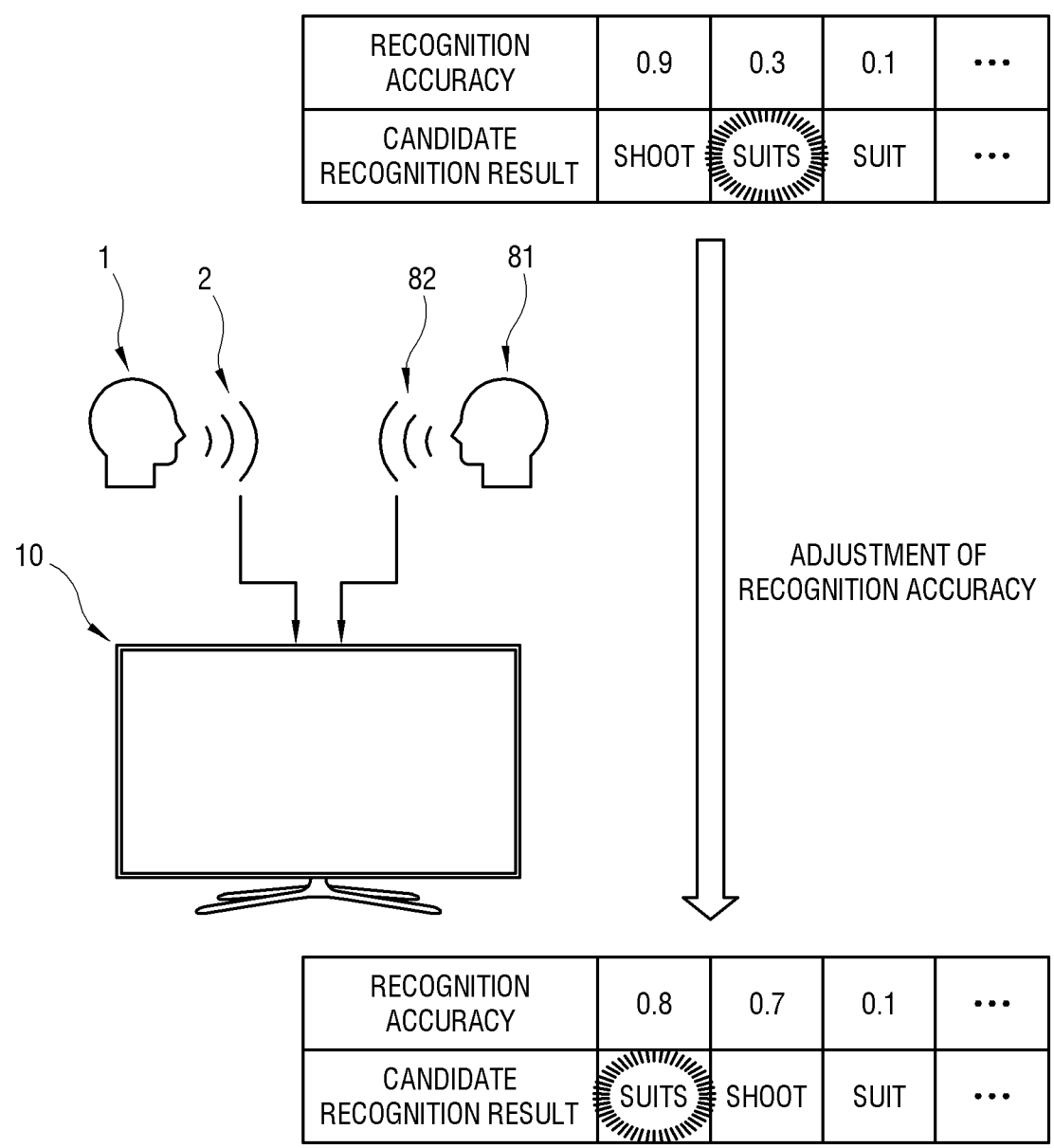
FIG. 8 illustrates that a recognition accuracy is adjusted when a conversation of an utterer is received, in connection with the operation S55 of FIG. 5.

FIG. 8 illustrates that a recognition accuracy is adjusted when a conversation of an utterer is received, in connection with the operation S55 of FIG. 5. Below, it will be assumed that the utterer characteristics are a male in his twenties, and the utterer 1 intends to watch a TV drama titled "suits" but utters the uttered voice 2 of "suit". In this case, it will be described that the recognition accuracy is adjusted as a conversation is received corresponding to the operation based on the first recognition result of "shoot" from the uttered voice 2 of "suit".

In other words, the processor 17 may obtain the candidate recognition result of "shoot", which for example has the highest recognition accuracy, as the first recognition result based on the third voice recognition model 43 for the group of males in their twenties with respect to the uttered voice 2 of "suit", and perform an operation based on the first recognition result of "shoot".

In response to the operation based on the first recognition result of "shoot", there may be a conversation between the utterer 1 and a counterpart utterer 81 about the operation based on the first recognition result of "shoot". For example, the counterpart utterer 81 may hear the uttered voice 2 of "suit" of the utterer 1, and then utter a counterpart uttered voice 82 of "it's suits, suits".

In this case, the processor 17 may identify the recognition success or failure in the uttered voice 2 of "suit" based on the conversation between the utterer 1 and the counterpart utterer 81, for example, based on the counterpart uttered voice 82 of the counterpart utterer 81. For example, the processor 17 may identify a keyword of "suits" from the counterpart uttered voice 82 by applying the voice recognition process to the counterpart uttered voice 82 of the counterpart utterer 81, and identify the recognition success or failure in the uttered voice 2 of "suit" based on for example the similarity between the first recognition result of "shoot" and the keyword.

When the similarity between the first recognition result of "shoot" and the keyword "suits" is greater than or equal to a preset value, the processor 17 identifies that the uttered voice 2 of "suit" is not successfully recognized and the utterance intention matches the keyword of "suits".

Like this, when the uttered voice 2 of "suit" is not successfully recognized and the utterance intention is identified as the keyword "suits", the recognition accuracies about the candidate recognition result of "shoot" and the candidate searching result of "suits" corresponding to the keyword of "suits" may be adjusted. The recognition accuracy about the candidate recognition result of "suits" may for example be adjusted from '0.3' into '0.8'. When the keyword of "suits" is not included in the candidate recognition results, "suits" may be added into the candidate recognition results. On the other hand, the recognition accuracy about the recognition result of "shoot" may for example be adjusted from '0.9' into '0.7'.

Therefore, when the uttered voice 2 of "suit" is received from the utterer 1 or another utterer in the future and the utterer characteristics of the utterer 1 or another utterer are identified as a male in his twenties, the processor 17 may obtain "suits" as the first recognition result based on the third voice recognition model 43 having the adjusted recognition accuracy.

Meanwhile, it will be described below with reference to FIG. 6 that the recognition accuracy is adjusted when the conversation is received corresponding to the operation based on the second recognition result of "suit" from the second uttered voice 62 of "suit", on the assumption that the third voice recognition model 43 has the candidate recognition results of "shoot", "suit" and "suits" with regard to the first uttered voice 61 of "suit", and the recognition accuracies about the candidate recognition results are respectively '0.9', '0.3' and '0.1', that is, on that assumption that the recognition accuracies of "suit" and "suits" among the candidate recognition results are changed.

That is, when the second uttered voice 62 of "suit" is received in response to the operation based on the first recognition result of "shoot" from the first uttered voice 61 of "suit", the processor 17 may for example identify the failure in recognizing the first uttered voice 61 of "suit" based ono the similarity between the first uttered voice 61 of "suit" and the second uttered voice 62 of "suit", and perform an operation based on the second recognition result of "suit" from the second uttered voice 62 of "suit".

In response to the operation based on the second recognition result of "suit" from the second uttered voice 62 of "suit", there may be a conversation between the utterer 1 and a counterpart utterer 81 about the operation based on the second recognition result of "suit". For example, the counterpart utterer 81 may hear the uttered voice 2 of "suit" of the utterer 1, and then utter a counterpart uttered voice 82 of "it's suits, suits".

In this case, the processor 17 may identify the recognition success or failure in the uttered voice 2 of "suit" based on the conversation between the utterer 1 and the counterpart utterer 81, for example, based on the counterpart uttered voice 82 of the counterpart utterer 81. For example, the processor 17 may identify a keyword of "suits" from the counterpart uttered voice 82 by applying the voice recognition process to the counterpart uttered voice 82 of the counterpart utterer 81, and identify the second uttered voice 62 of "suit" is not successfully recognized and the utterance intention is the keyword of "suits" based on for example the similarity between the second recognition result of "suit" and the keyword of "suits".

Like this, when the second uttered voice 62 of "suit" is not successfully recognized and the utterance intention is identified as the keyword of "suits", the recognition accuracy about the candidate searching result of "suits" corresponding to the keyword of "suits" may be adjusted to be for example be the highest. When the keyword of "suits" is not included in the candidate recognition results, "suits" may be added into the candidate recognition results. Therefore, when the first uttered voice 61 of "suit" is received in the future and the utterer characteristics of the utterer 1 are identified as a male in his twenties, the processor 17 may obtain "suits" as the first recognition result based on the third voice recognition model 43 having the adjusted recognition accuracy.

Like this, the processor 17 according to this embodiment adjusts the recognition accuracy based on the conversation received corresponding to the recognition result, thereby improving the suitability between the utterance intention and the recognition result, and improving the applicability and reliability of the voice recognition function.

Meanwhile, the embodiments of FIGS. 7 and 8 show that the voice recognition process is carried out based on the voice recognition engines provided according to the utterer groups, but the processor 17 may identify the recognition success or failure in the uttered voice 2, based on the similarity between the recognition result of the uttered voice 2 and the search word 72 or the keyword from the counterpart uttered voice 82, with the voice recognition process based on the voice recognition engine personalized for the utterer 1. When the recognition of the uttered voice 2 is failed but it is identified that the search word 72 is successfully found or the keyword from the counterpart uttered voice 82 is identified as the utterance intention, the processor 17 may adjust the recognition accuracies about the candidate recognition results respectively corresponding to the search words 72 or the keyword from the counterpart uttered voice 82 and the recognition result of the uttered voice 2.

Various embodiments of the disclosure may be achieved by software including one or more commands stored in a storage medium readable by the electronic apparatus 10 and the like. The storage medium comprises a recoding medium. For example, the processor 17 of the electronic apparatus 10 may call and execute at least one command among one or more stored commands from the storage medium. This enables the electronic apparatus 10 and the like apparatus to operate and perform at least one function based on the at least one called command. The one or more commands may include a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium.

For example, methods according to various embodiments of the disclosure may be provided as involved in a computer program product. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

According to the disclosure, there are provided an electronic apparatus and a control method thereof, in which suitability between utterance intention and a recognition result is improved because voice recognition is carried out based on a voice recognition model according to unique characteristics of an utterer, and applicability and reliability of a voice recognition function are improved because a recognition result suitable for the utterance intention is obtained even though a voice uttered by the utterer does not match the utterance intention.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
 a receiver configured to receive an uttered voice input, and
 a processor configured to:
  based on a first uttered voice input being received through the receiver, identify utterer characteristics of the first uttered voice input;
  identify one utterer group among a plurality of utterer groups based on the identified utterer characteristics;
  provide a first recognition result among a plurality of recognition results of the first uttered voice input based on a voice recognition model corresponding to the identified utterer group among a plurality of voice recognition models provided corresponding to the plurality of utterer groups, the plurality of recognition results being different in recognition accuracy from one another and a recognition accuracy of the first recognition result being highest in the plurality of recognition results;
  receive a second uttered voice input through the receiver with respect to the first recognition result;
  based on a similarity of the first uttered voice input and the second uttered voice input being greater than a predetermined threshold value, provide a second recognition result among the plurality of recognition results of the first uttered voice input, and
  based on the second recognition result being identified to be successful, increase a recognition accuracy of the second recognition result.

2. The electronic apparatus according to claim 1, wherein the processor is configured to obtain the first recognition result, of which the recognition accuracy is the highest, among the plurality of recognition results, as output.

3. The electronic apparatus according to claim 2, wherein the processor is configured to identify a recognition success or failure in association with the first uttered voice input based on the similarity between the first uttered voice input and the second uttered voice input, when the second uttered voice input is received corresponding to an operation based on the first recognition result.

4. The electronic apparatus according to claim 3, wherein the processor is configured to change recognition accuracies of the plurality of recognition results based on the identified recognition success or failure.

5. The electronic apparatus according to claim 4, wherein the processor is configured to obtain the second recognition result, of which the recognition accuracy is next highest, among the plurality of recognition results, when the similarity between the first uttered voice input and the second uttered voice input is greater than or equal to a preset value.

6. The electronic apparatus according to claim 5, wherein the processor is configured to change the recognition accuracy of the second recognition result to be higher than the recognition accuracy of the first recognition result based on a recognition success or failure of the second recognition result.

7. The electronic apparatus according to claim 5, wherein the processor is configured to change the recognition accuracies of the plurality of recognition results based on a searching result of an input search word, when the input search word corresponds to an operation based on the second recognition result.

8. The electronic apparatus according to claim 1, wherein the utterer characteristics comprise information of at least one among genders, ages, names, residence, nationalities, and occupations of utterers.

9. The electronic apparatus according to claim 1, wherein the processor is configured to identify the utterer characteristics based on information of at least one among a tone, loudness, and pace of the received first uttered voice input.

10. The electronic apparatus according to claim 1, wherein the processor is configured to obtain the first recognition result of the first uttered voice input, based on at least two voice recognition models among the plurality of voice recognition models.

11. The electronic apparatus according to claim 1, further comprising a communicator configured to communicate with a plurality of servers,
 wherein the processor is configured to receive at least one of the first recognition result of the first uttered voice input and the second recognition result of the second uttered voice input based on the voice recognition model identified corresponding to the utterer characteristics from at least one among the plurality of servers through the communicator.

12. A control method of an electronic apparatus, comprising:
 based on a first uttered voice input being received, identifying utterer characteristics of the first uttered voice input;
 identifying one utterer group among a plurality of utterer groups based on the identified utterer characteristics;
 providing a first recognition result among a plurality of recognition results of the first uttered voice input based on a voice recognition model corresponding to the identified utterer group among a plurality of voice recognition models provided corresponding to the plurality of utterer groups, the plurality of recognition results being different in recognition accuracy from one another and a recognition accuracy of the first recognition result being highest in the plurality of recognition results;
 receiving a second uttered voice input with respect to the first recognition result;
 based on a similarity of the first uttered voice input and the second uttered voice input being greater than a predetermined threshold value, providing a second recognition result among the plurality of recognition results of the first uttered voice input, and
 based on the second recognition result being identified to be successful, increasing a recognition accuracy of the second recognition result.

13. The control method according to claim 12, wherein the first recognition result, of which the recognition accuracy is the highest is obtained, from among a plurality of recognition results, as output.

14. The control method according to claim 13, wherein the method further comprises:
 identifying a recognition success or failure in association with the first uttered voice input based on the similarity between the first uttered voice input and the second uttered voice input, when the second uttered voice input is received corresponding to an operation based on the first recognition result.

15. The control method according to claim 14, further comprising changing recognition accuracies of the plurality of recognition results based on the identified recognition success or failure.

16. The control method according to claim 15, wherein the changing the recognition accuracies comprises obtaining the second recognition result, of which the recognition accuracy is next highest, among the plurality of recognition results, when the similarity between the first uttered voice input and the second uttered voice input is greater than or equal to a preset value.

17. The control method according to claim 16, wherein the obtaining the second recognition result comprises changing the recognition accuracy of the second recognition result to be higher than the recognition accuracy of the first recognition result based on a recognition success or failure of the second recognition result.

18. The control method according to claim 16, further comprising changing the recognition accuracies of the plurality of recognition results based on a searching result of an input search word, when the input search word g to an operation based on the second recognition result.

19. The control method according to claim 12, wherein the utterer characteristics comprise information of at least one among genders, ages, names, residence, nationalities, and occupations of utterers.

20. A non-transitory computer readable recording medium, in which a computer program is stored comprising instructions for performing a control method of an electronic apparatus, the control method comprising:

based on a first uttered voice input being received, identifying utterer characteristics of the first uttered voice input;

identifying one utterer group among a plurality of utterer groups based on the identified utterer characteristics;

providing a first recognition result among a plurality of recognition results of the first uttered voice input based on a voice recognition model corresponding to the identified utterer group among a plurality of voice recognition models provided corresponding to the plurality of utterer groups, the plurality of recognition results being different in recognition accuracy from one another and a recognition accuracy of the first recognition result being highest in the plurality of recognition results;

receiving a second uttered voice input with respect to the first recognition result;

based on a similarity of the first uttered voice input and the second uttered voice input being greater than a predetermined threshold value, providing a second recognition result among the plurality of recognition results of the first uttered voice input, and based on the second recognition result being identified to be successful, increasing a recognition accuracy of the second recognition result.

\* \* \* \* \*